US009610923B2

(12) United States Patent
Matsuura

(10) Patent No.: US 9,610,923 B2
(45) Date of Patent: Apr. 4, 2017

(54) VEHICLE

(71) Applicant: HONDA MOTOR CO., LTD., Tokyo (JP)

(72) Inventor: Shuken Matsuura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/921,209

(22) Filed: Oct. 23, 2015

(65) Prior Publication Data

US 2016/0114768 A1 Apr. 28, 2016

(30) Foreign Application Priority Data

Oct. 28, 2014 (JP) .................................. 2014-219738

(51) Int. Cl.
| | |
|---|---|
| B60J 5/10 | (2006.01) |
| B60S 1/58 | (2006.01) |
| B60S 1/52 | (2006.01) |
| B60S 1/04 | (2006.01) |

(52) U.S. Cl.
CPC ................. B60S 1/583 (2013.01); B60S 1/52 (2013.01); *B60S 1/0466* (2013.01)

(58) Field of Classification Search
CPC ...... B60S 1/50; B60S 1/52; B60S 1/58; B60S 1/583; B60S 1/46; B60J 5/10
USPC ....................... 296/96.15, 106, 50, 51, 146.8
See application file for complete search history.

(56) References Cited

U.S. PATENT DOCUMENTS

| | | | | |
|---|---|---|---|---|
| 2,289,650 | A | * 7/1942 | Horton ...................... | B60S 1/48 |
| | | | | 15/250.01 |
| 2,622,929 | A | * 12/1952 | Neufeld ..................... | B05B 1/10 |
| | | | | 15/250.01 |
| 3,913,167 | A | * 10/1975 | Frigon ..................... | B60S 1/522 |
| | | | | 15/250.04 |
| 4,387,853 | A | * 6/1983 | Sarai ......................... | B60S 1/52 |
| | | | | 15/250.01 |

(Continued)

FOREIGN PATENT DOCUMENTS

| | | | |
|---|---|---|---|
| EP | 0020446 | * | 9/1979 |
| FR | 2720991 A1 | | 12/1995 |

(Continued)

OTHER PUBLICATIONS

European Search Report dated Mar. 14, 2016, 7 pages.
Japanese Office Action with Partial English Translation dated Aug. 12, 2016, 8 pages.

*Primary Examiner* — Dennis H Pedder
(74) *Attorney, Agent, or Firm* — Rankin, Hill & Clark LLP

(57) ABSTRACT

A vehicle includes first and second window panels adjacent to each other and lying in the same plane, a wiper apparatus for wiping the first and second window panels, and a washer liquid nozzle unit for injecting washer liquids to the first and second window panels. The wiper apparatus has a pivot shaft and a wiper blade pivotable on the pivot shaft. The pivot shaft and the first window panel are located on the same side of a parting line between the first window panel and the second window panel. The washer nozzle unit has first and second nozzles, and is located on the same side of the parting line as the second window panel. The first nozzle injects a washer liquid to a wiped surface of the first window panel while the second nozzle injects a washer liquid to a wiped surface of the second window panel.

6 Claims, 8 Drawing Sheets

(56) References Cited

U.S. PATENT DOCUMENTS

| 6,520,424 B1* | 2/2003 | Lesser ................... B05B 1/14 |
| | | 239/284.1 |
| 2003/0145411 A1 | 8/2003 | Zuccaro et al. |
| 2013/0200648 A1* | 8/2013 | Farcas .................. B60J 5/105 |
| | | 296/146.8 |

FOREIGN PATENT DOCUMENTS

| JP | S62-052555 U | 4/1987 |
| JP | 6-63661 | 9/1994 |
| JP | 2013-47052 | 3/2013 |
| JP | 2014-12448 | 1/2014 |

\* cited by examiner

VEHICLE

FIELD OF THE INVENTION

The present invention relates to a vehicle having a wiper apparatus for wiping two adjacent window panels, and a washer liquid nozzle unit for injecting washer liquids to the two window panels.

BACKGROUND OF THE INVENTION

Some vehicles such as automobiles have two adjacent window panels lying in the same plane. A boundary line between the two window panels is often called "parting line". This parting line extends through a gap between the two window panels. A wiper blade of a wiper apparatus moves from one of the two window panels across the parting line to the other window panel for wiping the same. Washer liquid injected from a washer liquid nozzle unit to the one of the window panel partially falls into the gap between the window panels when the wiper blade passes across the parting line. To address this problem, there is a need for a technique for efficiently supplying the washer liquid, which has been injected to the one window panel, to the other window panel.

It is thought that a washer liquid nozzle unit has two nozzles for injecting respective washer liquids to two window panels. Such a technique is known from JP-U-6-63661.

The technique disclosed in JP-A-U-6-63661 is applied to a front window of a driver's compartment of a construction machine such as a power shovel and a crane. The front window is formed by a vertically elongated window frame of a generally rectangular shape, and upper and lower glass panels mounted in the frame. The lower glass panel (first window panel) and the upper window panel (second window panel) are vertically adjacently disposed in the same plane. A parting line extends between the upper glass panel and the lower glass panel.

A wiper apparatus has a pivot shaft located on a lower corner of the upper glass panel. A wiper blade is vertically pivotable on the pivot shaft to wipe both of the upper and lower glass panels. A washer liquid nozzle unit is disposed on the window frame in the vicinity of an upper corner of the upper glass panel. The washer liquid nozzle unit, which is diagonally opposed to the pivot shaft, has two nozzles. One of the two nozzles injects a washer liquid to the upper glass panel while the other nozzle injects a washer liquid to the lower glass panel.

The washer liquid is injected from the other nozzle across the parting line onto a region or point of a surface of the lower glass panel. Due to a relatively long distance between the other nozzle and the region, an angle at which the washer liquid is injected relative to the surface of the lower glass panel is smaller. To reliably supply the washer liquid to the surface of the lower glass panel in spite of the smaller injection angle, the technique disclosed in JP-U-6-63661 needs to be further improved. Thus, this technique should not be applied to vehicles as it is.

SUMMARY OF THE INVENTION

An object of the present invention is to provide a technique for reliably supplying washer liquids from a washer liquid nozzle unit to two window panels.

According to one aspect of the present invention, there is provided a vehicle comprising first and second window panels adjacent to each other and lying in the same plane, a wiper apparatus for wiping the first and second window panels, and a washer liquid nozzle unit for injecting washer liquids to the first and second window panels, the first window panel and the second window panel defining a parting line therebetween, the wiper apparatus comprising a pivot shaft located on the same side of the parting line as the first window panel, and a wiper blade pivotable on the pivot shaft to wipe the first and second window panel, the washer liquid nozzle unit being located on the same side of the parting line as the second window panel, and the washer liquid nozzle unit comprising a first nozzle for injecting a washer liquid to the first window panel, and a second nozzle for injecting a washer liquid to the second window panel.

The pivot shaft on which the wiper blade pivots is located on the first window panel. The wiper blade rests in a stop position usually set such that the wipe blade avoids, as much as possible, obstructing transparent regions of the first and second window panels. That is, the stop position of the wiper blade is located on the first window panel far away from the second window panel. The first and second window panels have their outer surfaces to be wiped by the wiper blade. The outer surfaces are often called "wiped surfaces".

The washer liquid nozzle unit has the first and second nozzles located beside the second window panel. The second nozzle injects the washer liquid toward the wiped surface of the second window panel. A region or point, onto which the washer liquid injected from the second nozzle lands, is located on the wiped surface of the second window panel without spanning the parting line between the first window panel and the second window panel. An injection distance over which the washer liquid is injected from the second nozzle to the region is short. Due to the short injection distance between the second nozzle and the region, an injection angle at which the washer liquid is injected relative to the wiped surface of the second window panel is large. The washer liquid can be reliably supplied from the second nozzle to the predetermined region of the second window panel.

Meanwhile, the first nozzle injects the washer liquid to the wiped surface of the first window panel. A region or point, onto which the washer liquid injected from the first nozzle lands, is located across the parting line from the unit. An injection distance over which the washer liquid is injected from the first nozzle to the region is relatively long. Due to the relatively long injection distance between the first nozzle and the region, an injection angle at which the washer liquid is injected relative to the wiped surface of the first widow panel is small. The stop position of the wiper blade is located on the first window panel far away from the parting line. Unlike the wiper blade in the stop position, the region onto which the washer liquid is injected is located near the parting line. The washer liquid should be injected from the first nozzle toward the wiper blade. The wiper blade can receive a splash of the washer liquid upon the injection of the washer liquid onto the region. This ensures the supply of the washer liquid from the first nozzle to the first window panel.

Therefore, the washer liquids can be reliably supplied from the washer liquid nozzle unit to both of the two window panels.

Preferably, the second window panel includes a transparent region having an edge portion located alongside the parting line, and the second nozzle includes an injection port directed to inject the washer liquid along the edge portion of the transparent region of the second window panel.

The injection port of the second nozzle is directed to inject the washer liquid to the transparent region of the second window panel along the edge portion located alongside the parting line.

When the wiper blade pivots from the wiped surface of the first window panel across the parting line toward the wiped surface of the second window panel, the wiper blade at first reaches the edge portion of the transparent region of the second window panel, the edge portion being located alongside the parting line. As a result, the injected washer liquid along the edge portion located alongside the parting line can be quickly applied by the wiper blade over a wide area of the wiped surface. This makes it possible for vehicle passengers to quickly have a field of view through the second window panel.

Preferably, the first and second window panels are arranged side by side, and the first and second window panels have outer surfaces to be wiped by the wiper blade, the outer surfaces defining a curved surface, the curved surface being entirely curved in an outward convex shape in a direction of the side-by-side arrangement of the first and second window panels. The curved surface has an apex located on the same side of the parting line as the first window panel, and the first nozzle has an injection port directed to inject the washer liquid to the first window panel between the parting line and the apex of the curved surface.

The surface defined by the wiped surfaces of the first and second window panels is outwardly convex throughout in the direction of the side-by-side arrangement of the first and second window panels. The apex of the curved surface is located on the same side of the parting line as the first window panel. An amount of outward protrusion of the curved surface becomes greater from the parting line toward the apex such that the amount of the outward protrusion is the greatest on the apex. The amount of the outward protrusion becomes smaller from the apex in a direction opposite from the parting line. The region, onto which the washer liquid injected from the first nozzle lands, is closer to the parting line than the apex is. Thus, an injection angle at which the washer liquid is injected relative to the wiped surface of the first window panel is large. The washer liquid can be more reliably supplied from the first nozzle to the predetermined region of the first window panel.

Preferably, the first and second nozzles are connected to a single tube for feeding the washer liquids thereto, and the injection port of the first nozzle has a diameter and the injection port of the second nozzle has a diameter, the diameter of the injection port of the first nozzle being smaller than the diameter of the injection port of the second nozzle.

The first and second nozzles are connected to the single tube for feeding the washer liquids thereto. The use of the single tube achieves a simple structure for feeding the washer liquids to the first and second nozzles. The diameter of the injection port of the first nozzle is smaller than the diameter of the injection port of the second nozzle. The washer liquid is injected from the first nozzle under a higher pressure due to the smaller diameter of the injection port of the first nozzle. Thus, the washer liquid can be farther injected from the first nozzle. This enables quicker supply of the washer liquid to a vicinity of the wiper blade.

According to another aspect of the present invention, there is provided a vehicle comprising first and second window panels adjacent to each other and lying in the same plane, a wiper apparatus for wiping the first and second window panels, and a washer liquid nozzle unit for injecting washer liquids to the first and second window panels, the first window panel and the second window panel defining a parting line therebetween, the first window panel including a transparent region having an edge portion located alongside the parting line, the second window panel including a transparent region having an edge portion located alongside the parting line, the washer liquid nozzle unit being located between a first straight line along the edge portion of the transparent region of the first window panel and a second straight line along the edge portion of the transparent region of the second window panel, and the washer liquid nozzle unit comprising a first nozzle for injecting a washer liquid to the first window panel, and a second nozzle for injecting a washer liquid to the second window panel.

The washer liquid nozzle unit has the first and second nozzles and is located between the first straight line along the edge portion of the transparent region of the first window panel and the second straight line along the edge portion of the transparent region of the second window panel. The first and second window panels have their outer surfaces to be wiped by the wiper blade.

Since the washer liquid nozzle unit is located between the first and second straight lines, the washer liquids can provide their respective trajectories extending from the first and second nozzles to the regions without crossing the parting line.

The first and second nozzles inject the washer liquids toward the respective wiped surfaces of the window panels. The regions or points, onto which the washer liquids injected from the first and second nozzles land, are located on the wiped surfaces of the first and second window panels, respectively, without spanning the parting line between the window panels. The injection distances over which the washer liquids are injected from the first and second nozzles to the regions are short. Due to these short distances, the injection angles at which the washer liquids are injected relative to the wiped surfaces of the first and second window panels are large. Thus, the washer liquids can be reliably supplied from the washer liquid nozzle unit to both of the two widow panels. Additionally, it can prevent a waste of the washer liquids.

Preferably, the washer liquid nozzle unit is located on the parting line.

The washer liquid nozzle unit is located on the parting line between the first and second straight lines. This ensures that the washer liquid nozzle unit injects the washer liquids to any points on the first and second window panels without the washer liquids crossing the parting line. Thus, the degree of freedom to set the injection angles in injecting the washer liquids onto the respective regions is great.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
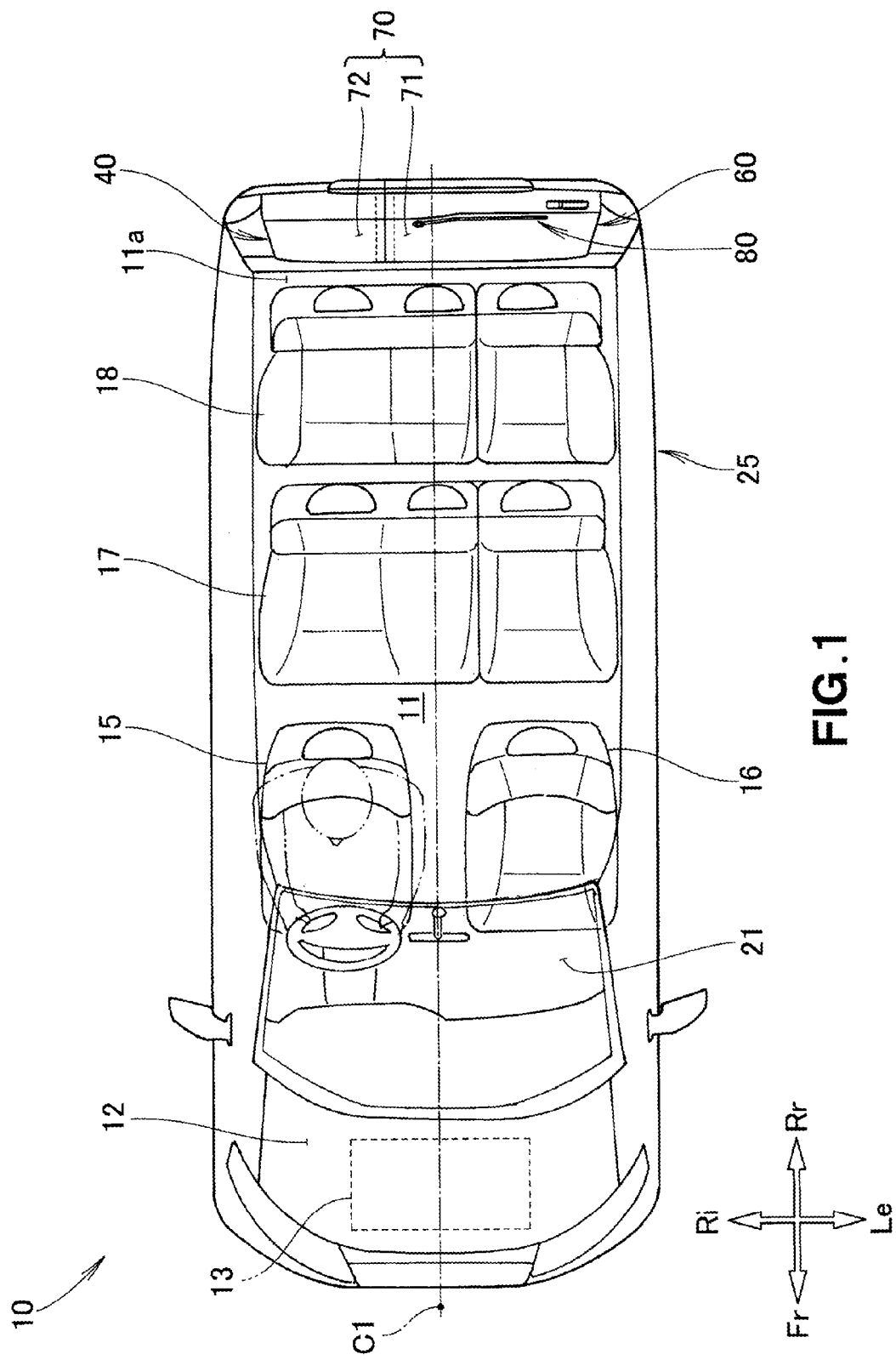
FIG. 1 is a transparent view illustrating in to plan a vehicle according to a first embodiment of the present invention.

Vehicles in preferred embodiments of the present invention are discussed below. It is to be understood that the terms "front", "rear", "left", "right", "upper" and "lower" as used herein indicate forward, rearward, left, right, upward, and downward directions, respectively, in which a vehicle drive sees. Reference characters "Fr", "Rr", "Le", "Ri", "Up" and "Dw" in the drawings indicate front, rear, left, right, upward, and downward sides of the vehicles.

As shown in FIG. 1, a body 10 of a vehicle 25 such as a car is a monocoque body. A centerline C1 extends on a width center of the vehicle 10 in a front-rear direction of the vehicle 10. The vehicle body 25 is substantially symmetry about the widthwise centerline C1.

The vehicle 10 shown in FIG. 1 is a right-hand drive van. The vehicle 10 has an engine compartment 12 formed in front of a passenger compartment 11. An engine 13 (a power source 13 for driving the vehicle) is mounted in the engine compartment 12. Three rows of seats for passengers are disposed in the passenger compartment 11.

A driver's seat 15 is disposed on a right side of a front part of the passenger compartment 11. A front passenger seat 16 is disposed adjacent the driver's seat 15. The widthwise centerline C1 is located between the driver's seat 15 and the passenger's seat 16. That is, the driver's seat 15 is offset rightward from the widthwise centerline C1 while the front passenger's seat 16 is offset leftward from the widthwise centerline C1. A right side of the vehicle is hereinafter referred to as "driver's-seat side" while a left side of the vehicle is hereinafter referred to as "front-passenger's-seat side", where appropriate. The driver's seat 15 and the front passenger's seat 16 are aligned with each other as the vehicle is viewed from the lateral side. These seats 15, 16 are collectively referred to as "first row of seats", where appropriate.

Behind the driver's seat 15 and the front passenger's seat 16 (first row of seats 15, 16) is a second row of seats 17 for three passengers to sit on. The second row of seats 17 extends in a width direction of the vehicle. A third (rear) row of seats 18 for three passengers to sit on is disposed behind the second (middle) row of seats 17. The third row of seats 18 extends in the width direction of the vehicle. The second row of seats is in the form of a bench defined by two seats continuously arranged in the width direction of the vehicle. The two seats defining the second row of seats 17 are each foldable.

The third row of seats 18 is formed as is the second rows of seats 17, and hence the detailed description of the third row of seats is omitted. A luggage compartment 11a for loading of luggage is formed behind the third row of seats 18 and defines a rear end portion of the passenger compartment 11.

Figure 2:
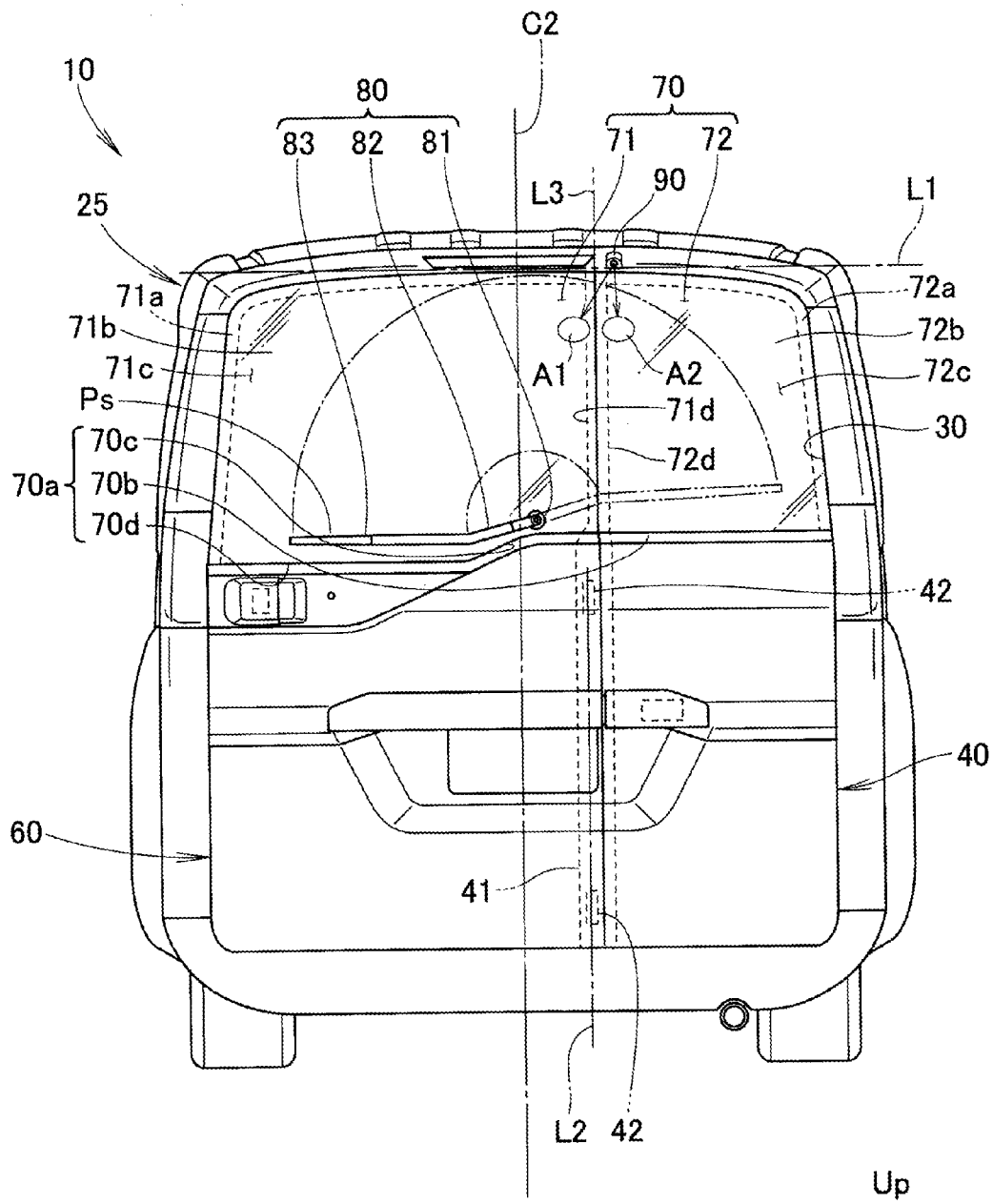
FIG. 2 is a rear elevation view of the vehicle of FIG. 1.
Figure 3:
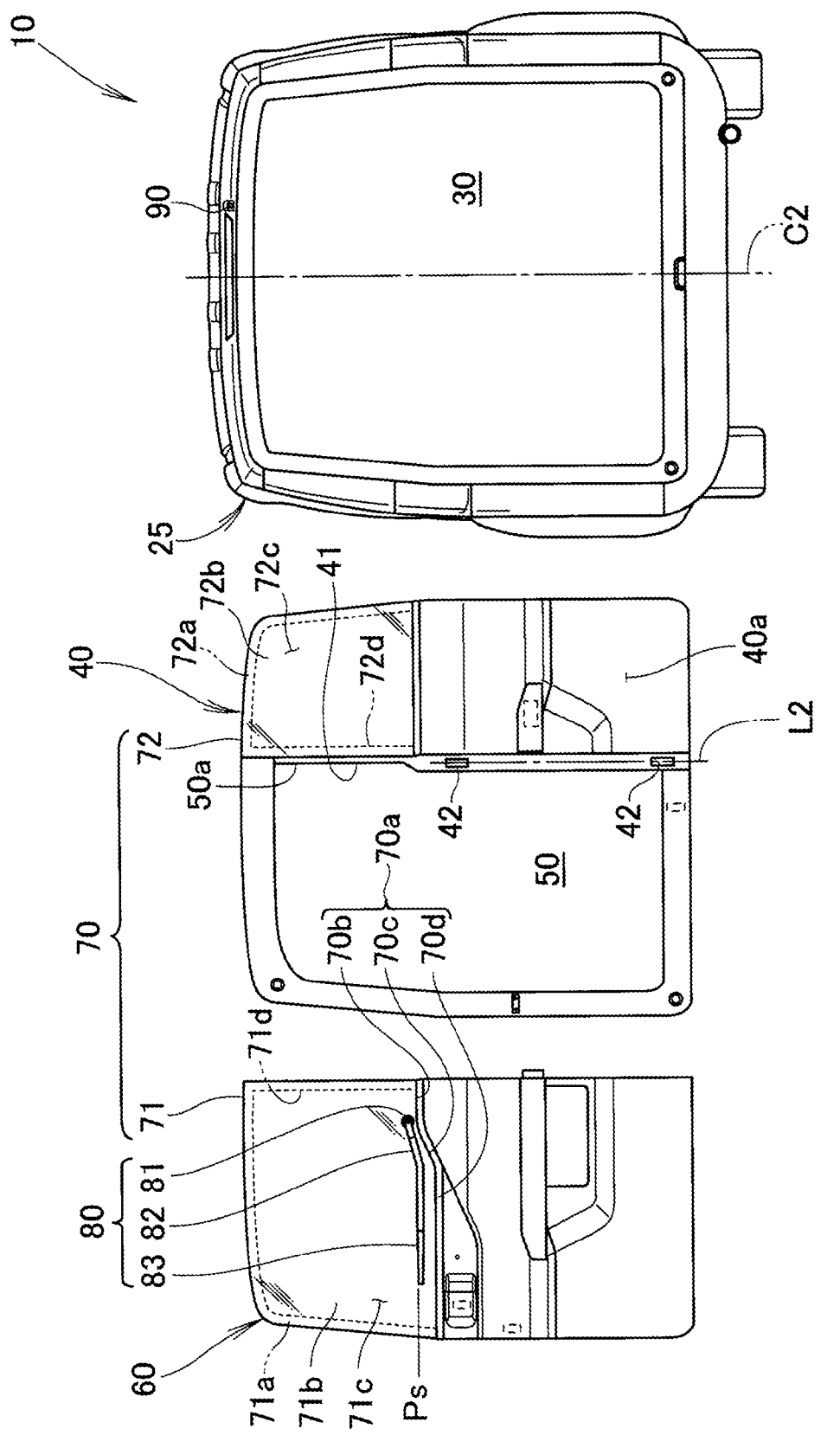
FIG. 3 is an exploded view of the vehicle of FIG. 2.

As shown in FIGS. 2 and 3, the vehicle body 25 has a rear opening 30 over the entire width and height of a rear end thereof. The rear opening 30 is in a generally rectangular shape including a generally square shape. The rear opening 30 can be opened and closed by a tailgate 40. The tailgate 40 is attached to an upper end portion of the vehicle body 25 such that the tailgate 40 can vertically move between open and closed positions. That is, the tailgate 40 is attached to a rear part of the vehicle body 25 such that the tailgate 40 can vertically pivot on a first pivot axis L1 horizontally extending at an upper part of the vehicle body 25. The tailgate 40 has one part defining a rear side of the vehicle when the tailgate is in the closed position.

The tailgate 40 has a sub-door opening 50 over part of the entire width thereof. The sub-door opening extends over the entire height of the tailgate 40. The sub-door opening 50 is vertically elongated in a generally rectangular shape. A passenger can get in and/or out of the vehicle through the sub-door opening 50. The sub-door opening 50 ranges from an end portion of the front-passenger's-seat side of the vehicle 10 beyond the width center of the vehicle (i.e., beyond a centerline C2 vertically extending on the width center of the vehicle). A sub-door 60 is attached to the sub-door opening 50 such that the sub-door can move between open and closed positions. The sub-door 60 defines a part of the rear side of the vehicle 10 when the tailgate 40 and the sub-door 60 are in the closed positions.

The centerline C2 vertically extending on the width center of the vehicle is hereinafter referred to as "widthwise centerline C2", where appropriate. The vertically extending widthwise centerline C2 is orthogonal to the widthwise centerline C1 extending in the front-rear direction of the vehicle.

The sub-door opening 50 has a lateral or right edge 50a located on the driver's-seat side of the widthwise centerline C2. A pillar 41 is disposed on the right edge 50a. The pillar 41 overlaps the driver's seat 15 (FIG. 1) when the vehicle 10 is viewed from behind, and vertically extends along the right edge 50a of the sub-door opening 50.

The sub-door 60 is attached to the pillar 41 by means of upper and lower hinges 42, 42 such that the sub-door 60 horizontally pivots on these two hinges 42, 42. To move to the open position, the sub-door 60 pivots away from a left edge side of the rear opening 30, the left edge side being located oppositely from the driver's-seat-side. A second pivot axis L2 extends vertically through centers of the two hinges 42, 42. The sub-door 60 pivots on the second pivot axis L2.

Disposed in an upper half of the rear side of the vehicle 10 is a rear window panel 70 extending in the width direction of the vehicle. The rear window panel 70 is defined by first and second window panels 71, 72. The first window panel 71 is a sub-door-side window panel secured to the sub-door 60 and the second window panel 72 is a tailgate-side window panel secured to the tailgate 40. Alternatively, the first window panel 71 may be one of the sub-door-side window panel and the tailgate-side window panel, and the second window panel 72 may be the other.

Both the first window panel 71 and the second window panel 72 are glass panels etc., which allow light to pass therethrough. The panels 71, 72 are continuously arranged in the width direction of the vehicle. The first and second window panels 71, 72 have their respective rear (outer) surfaces generally flush with each other. In other words, the first window panel 71 (sub-door-side window panel) and the second window panel (tailgate-side window panel) are adjacent to each other and lie in the same plane.

The first and second window panels 71, 72 have their edges 71a, 72a taking the form of opaque strips of predetermined widths. These opaque edges 71a, 72a are defined by coating layers (often called "black ceramic coating") applied to inner surfaces of the first and second window panels 71, 72. The inner surfaces of the panels 71, 72 are defined as facing the passenger compartment 11. The first and second window panels 71, 72 have their respective transparent, see-through regions 71b, 72b other than the opaque edges 71a, 72a. A person can see through the regions 71b, 72b from inside and outside the passenger compartment 11.

Between the first window panel 71 and the second window panel 72 is a straight line L3. The line L3 is defined as a parting line (a boundary line) L3. The parting line L3 and the second pivot axis L2 are located in parallel to each other on the driver's-seat side of the widthwise centerline C2. The parting L3 is located farther from the widthwise centerline C2 than the second pivot axis L2 is.

The rear window panel 70 has its upper edge defined by respective upper edges of the first window panel 71 and the second window panel 72. The rear window panel 70 has its right edge defined by a right edge of the second window panel 72 while the rear window panel 70 has its left edge defined by a left edge of the first window panel 71.

The rear window panel 70 has a lower edge 70a. The lower edge 70a is defined by a driver's-seat-side horizontal portion 70b, a slanting edge 70c and a front-passenger's-seat-side horizontal portion 70d. The driver's-seat-side horizontal portion (driver's-seat-side lower edge) 70b generally horizontally extends from an end portion of the driver's-seat side to the widthwise centerline C2. The slanting edge 70c extends obliquely downwardly from the widthwise centerline C2 toward the end portion of the front-passenger's-seat side. The front-passenger's-seat-side horizontal portion 70d extends from a lower end of the slanting edge 70c to the end portion of the front-passenger's-seat side. The lower edge 70a of the rear window panel 70 is in a stepped shape lower on the front-passenger's-seat side than on the driver's-seat side. That is, the front-passenger's-seat-side horizontal portion 70d is located one level lower than the driver's-seat-side horizontal portion 70b.

The slanting edge 70c interconnects the driver's-seat-side horizontal portion 70b and the front-passenger's-seat-side horizontal portion 70d. The interconnecting portion 70c may include an inflection point, not the illustrated linear shape of the slanting edge. The portion including the inflection point, which makes the widthwise centerline C2 easy to find, is preferable.

The driver's-seat-side horizontal portion 70b is defined by a portion of a lower edge of the first window panel 71 and a lower edge of the second window panel 72. The slanting edge 70c and the front-passenger's-seat-side horizontal portion 70d are defined by the remaining portion of the lower edge of the first window panel 71.

Figure 4:
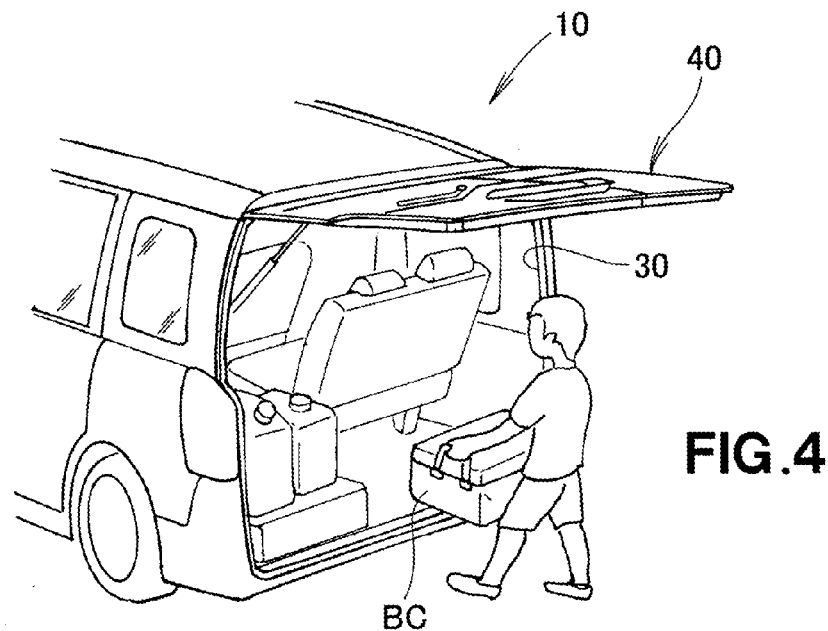
FIG. 4 is a view of the vehicle with a tailgate opened.

Next, a description is made as to how to use the tailgate 40. As shown in FIG. 4, the tailgate 40 pivots upwardly to allow a large luggage BC to be loaded into the vehicle 10. The rear opening 30, which defines the entire rear side of the vehicle 10, is large enough to facilitate loading of the large luggage BC into the vehicle.

Figure 5:
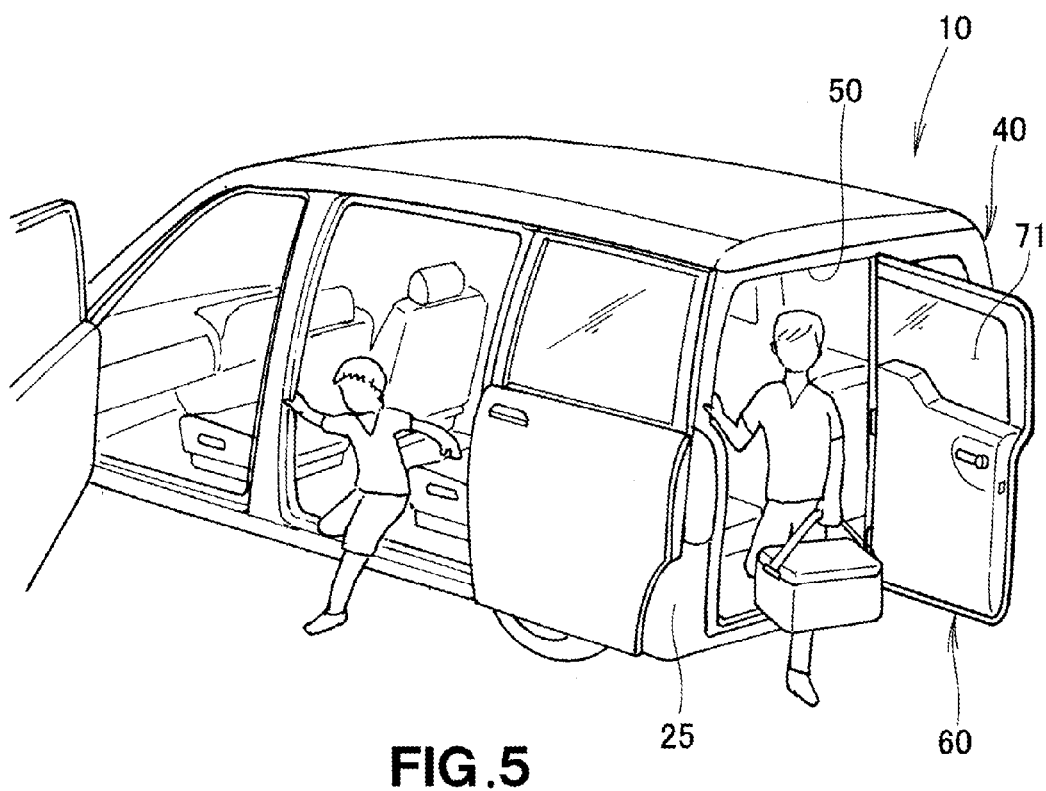
FIG. 5 is a view of the vehicle with a sub-door opened.

As shown in FIG. 5, the sub-door opening 50 is formed over the part of the entire width of the tailgate 40 and extends over nearly the entire height of the tailgate 40. The sub-door opening 50 is used to allow a person to get in and/or out of the vehicle 10 from a rear part of the vehicle 10.

Turning to FIG. 2, the vehicle 10 includes a single wiper apparatus 80 for wiping the first and second window panels 71, 72, and a single washer liquid nozzle unit 90 for spraying washer liquids W1, W2 onto the first window panel 71 and the second window panel 72. The washer liquid nozzle unit 90 is one part of a washer liquid feeding apparatus (not shown).

More specifically, the wiper apparatus 80 is operable to wipe both the first window panel 71 and the second window panel 72. The wiper apparatus 80 includes a pivot shaft 81, a wiper arm 82 and a wiper blade 83.

The pivot shaft 81 is located on the same side of the parting line L3 as the first window panel 71 when the vehicle 10 is viewed from behind. That is, the pivot shaft 81 is located between the parting line L3 and the widthwise centerline C2. More specifically, the pivot shaft 81 is located directly above the driver's-seat-side horizontal portion 70b of the rear window panel 70 and attached to the first window panel 71.

The wiper arm 82 extends outwardly from the pivot shaft 81 in the width direction of the vehicle. When the wiper blade 83 is in a stop position Ps shown in FIG. 2, the wiper arm 82 extends from the pivot shaft 81 along the lower edge 70a of the rear window panel 70. That is, the wiper arm 82 inclines downward on the opposite side of the widthwise centerline C2 from the parting line L3.

The wiper blade 83 extends outwardly from a distal end of the wiper arm 82 in the widthwise direction of the vehicle. The wiper blade 83 pivots on the pivot shaft 81 to wipe the first window panel 71 and the second window panel 72. The stop position Ps is set such that the wiper blade 83 avoids, as much as possible, obstructing the transparent regions of the first and second window panels 71, 72. That is, on the first window panel 71, the stop position Ps of the wiper blade 83 is located far away from the second window panel 72. The wiper blade 83 extends along the front-passenger's-seat-side horizontal portion 70d of the rear window panel 70. The first and second widow panels 71, 72 have their outer surfaces facing the outside of the vehicle. These outer surfaces are defined as "wiped surfaces" to be wiped by the wiper blade 83.

If the stop position Ps of the wiper blade 83 were set on the second window panel 72, as indicated by a phantom line of FIG. 2, the wiper blade 83 would extend from the pivot shaft 83 toward and then along the second window panel 72. The wiper blade 83 in the stop position Ps would hinder the first window panel 71 from opening. That is, the first window panel 71 cannot open. This is why the stop position Ps of the wiper blade 83 is set on the first window panel 71 far away from the second window panel 72.

As is clear from the foregoing, the wiper blade 83 rests along the front-passenger's-seat-side horizontal portion 70d of the rear window panel 70 when the wiper apparatus is at rest. That is, when in the stop position Ps, the wiper blade 83 is located adjacent the low level portion of the lower edge 70a of the rear window panel 70. As a result, when wiping the rear window panel 70, the wiper apparatus 80 reaches the lowermost level region adjacent to the front-passenger's-seat-side horizontal portion 70d of the rear window panel 70. That is, the wiper apparatus 80 can wipe a wider range of the rear window panel 70. The wiper blade 83 stops in place on the outer surface of the rear window panel 70. The wiper arm 82 and the wiper blade 83, which are disposed along the lower edge 70a of the rear window panel 70, provide an improved visual appearance. The pivot shaft 81, which is disposed on the surface of the rear window panel 70, provides an improved visual appearance.

Figure 6:
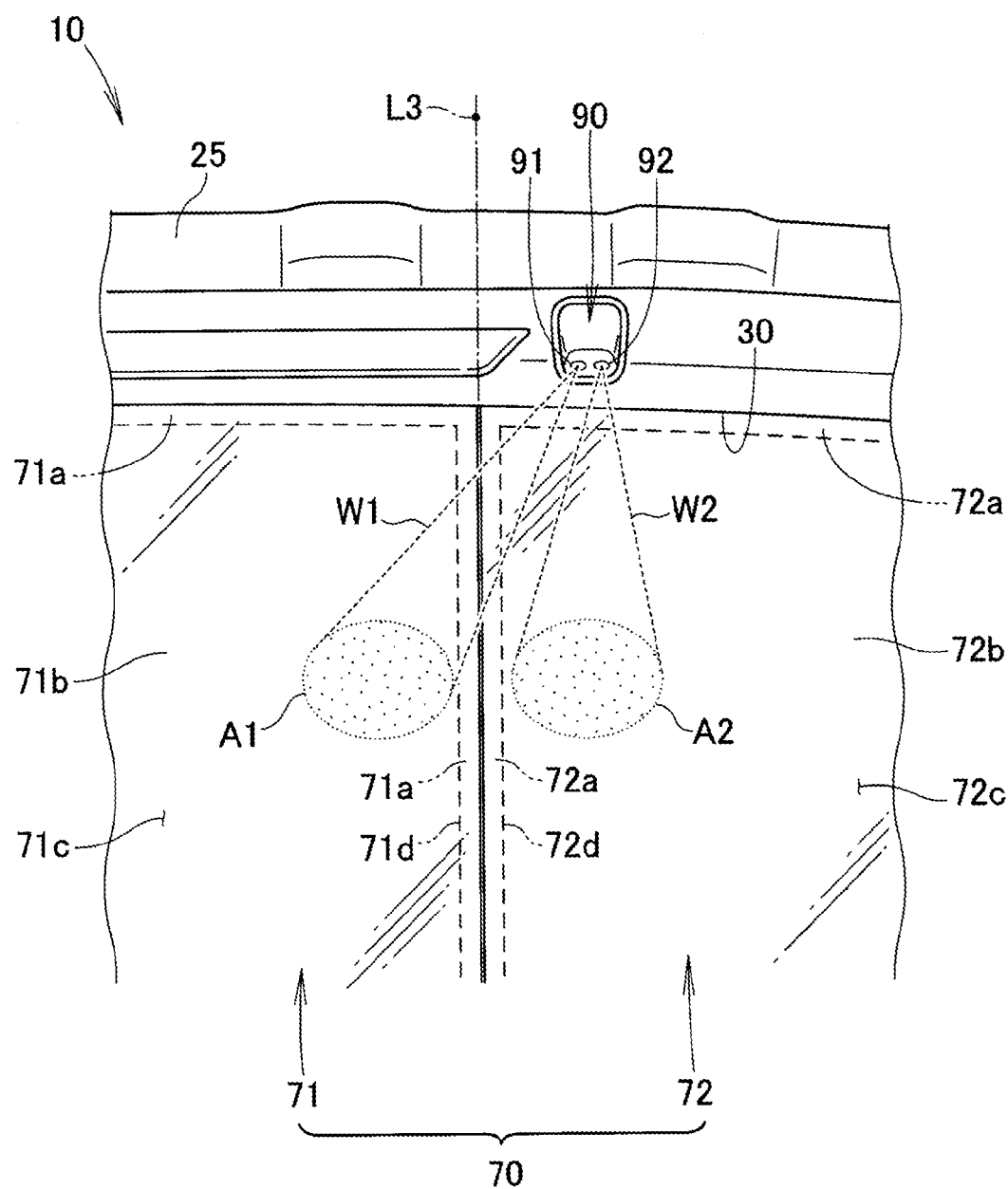
FIG. 6 is an enlarged view of a washer liquid nozzle unit of FIG. 2 and the surroundings of the unit.
Figure 7:
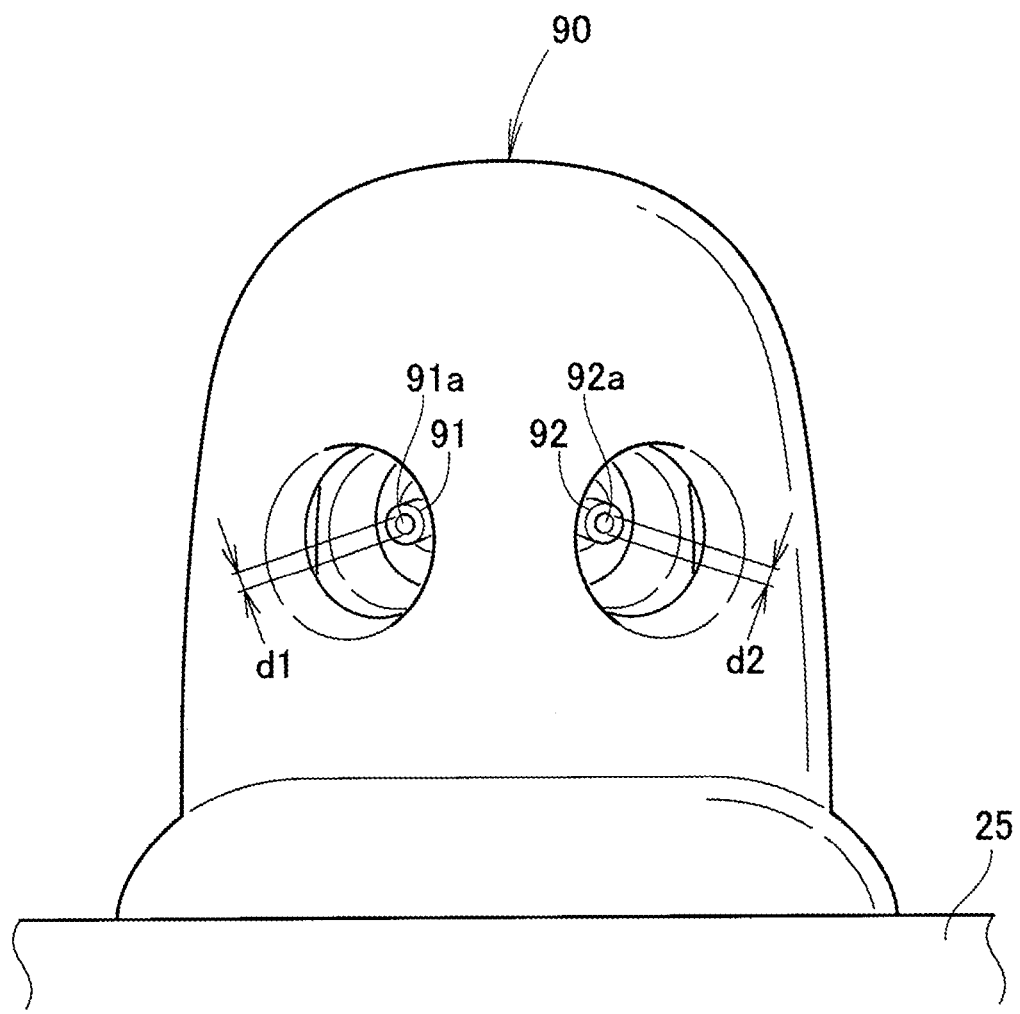
FIG. 7 is an enlarged view of the washer liquid nozzle unit, as viewed from below.

As shown in FIG. 6, the washer liquid nozzle unit 90 is located on the same side of the parting line L3 as the second window panel 72. The washer liquid nozzle unit 90 is attached to the upper part of the vehicle body 25 directly above the rear opening 30. As shown in FIGS. 6 and 7, the washer liquid nozzle unit 90 includes a first nozzle 91 for injecting a washer liquid W1 onto the first widow panel 71, and a second nozzle 92 for injecting a washer liquid W2 onto the second window panel 72.

Figure 8:
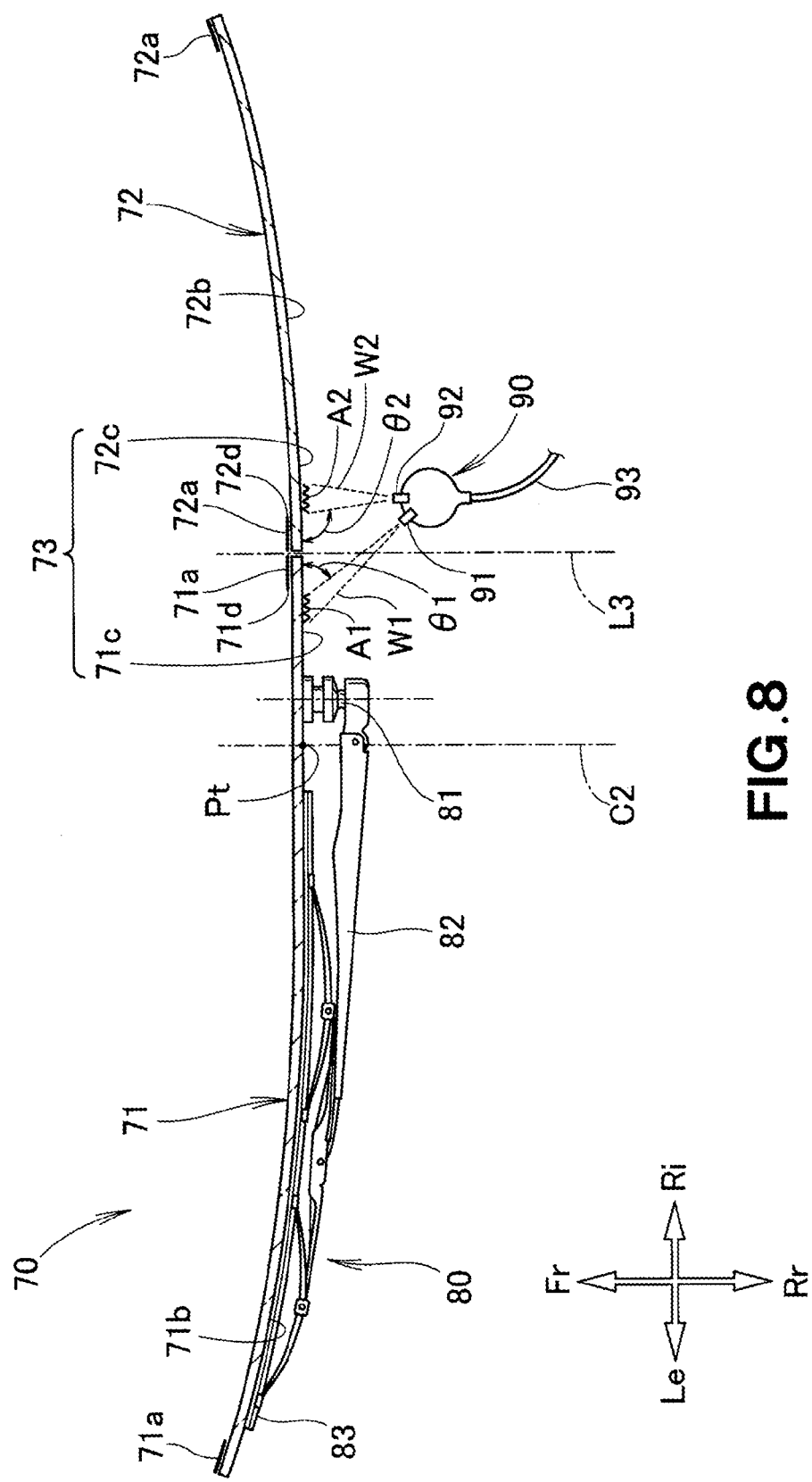
FIG. 8 is a cross-sectional view showing the first and second window panels, wiper apparatus and washer liquid nozzle unit of FIG. 2, as seen from above.

As shown in FIGS. 2 and 8, the first and second window panels 71, 72 have their outer surfaces 71c, 72c to be wiped by the wiper blade 83. The first and second window panels 71, 72 are arranged side by side. The surface defined by the entire outer surfaces 71c, 72c is outwardly convexly curved throughout in the direction of the side-by-side arrangement of the window panels 71, 72. The entirely outward convex surface is referred to as "curved surface 73".

The curved surface 73 has its width extending in the direction of the side-by-side arrangement of the first and second window panels 71, 72. The width of the curved surface 73 has its centerline parallel to the parting line L3. The curved surface 73 has its apex Pt on the centerline of the width of the curved surface 73. This centerline is located, for example, on the widthwise centerline C2. The widthwise centerline C2 is hereinafter referred as "curve centerline C2". The curve centerline C2 is located on the same side of the parting line L3 as the first window panel 71. The apex Pt of the curved surface 73 is also located on the same side of the parting line L3 as the first widow panel 71.

The first nozzle 91 has an injection port 91a (FIG. 7) directed to inject the washer liquid W1 to the first window panel 71 between the parting line L3 and the curve centerline C2 (i.e., the apex Pt of the curved surface 73).

As shown in FIGS. 6 and 8, the second nozzle 92 has an injection port 92a (FIG. 7) directed to inject the washer liquid W2 to the transparent region 72b of the second window panel 72 along an edge portion 72d located alongside the parting line L3. The expression "inject the washer liquid W2 along an edge portion 72d located alongside the parting line L3" should be interpreted to cover the situation where the washer liquid W2, which is injected from the second nozzle 92 onto the wiped surface 72c, flows along the edge 72a located alongside the parting line L3.

As shown in FIG. 7, the injection port 91a of the first nozzle 91 has its diameter d1 smaller than a diameter d2 of the injection port 92a of the second nozzle 92 (d1<d2).

As shown in FIG. 8, the first and second nozzles 91, 92 are connected to a single tube 93 for feeding the washer liquids W1, W2. The washer-liquid feeding apparatus can feed the washer liquids W1, W2 from a washer pump (not shown) through the single tube 93 to the first and second nozzles 91, 92.

The foregoing discussion is summarized as follows.

In the embodiment of the present invention, the pivot shaft 81 on which the wiper blade 83 pivots is located on the first window panel 71. The stop position Ps of the wiper blade 83 is set such that the wipe blade 83 avoids, as much as possible, obstructing the transparent regions 71b, 72b of the first and second window panels 71, 72. That is, the stop position Ps of the wiper blade 83 is located on the first window panel 71 far away from the second window panel 72. The outer surfaces 71c, 72c of the first and second window panels 71, 72 are to be wiped by the wiper blade 83. The outer surfaces 71c, 72c are the "wiped surfaces", as defined above.

As shown in FIG. 8, the washer liquid nozzle unit 90 has the first and second nozzles 91, 92 located beside the second window panel 72. The second nozzle 92 injects the washer liquid W2 toward the wiped surface 72c of the second window panel 72. A region or point A2, onto which the washer liquid. W2 injected from the second nozzle 92 lands, is located on the wiped surface 72c without spanning the parting line L3 between the first window panel 71 and the second window panel 72. An injection distance over which the washer liquid W2 is injected from the second nozzle 92 to the region A2 is short. Due to the short injection distance between the second nozzle 92 and the region A2, an injection angle θ2 at which the washer liquid W2 is injected relative to the wiped surface 72c of the second window panel 72 is large. The washer liquid W2 can be reliably supplied from the second nozzle 92 to the predetermined region A2 of the second window panel 72.

Meanwhile, the first nozzle 91 injects the washer liquid W1 to the wiped surface 71c of the first window panel 71. A region or point A1, onto which the washer liquid W1 injected from the first nozzle 91 lands, is located across the parting line L3 from the unit 90. An injection distance over which the washer liquid W1 is injected from the first nozzle 91 to the region A1 is relatively long. Due to the relatively long injection distance between the first nozzle 91 and the region A2, an injection angle θ1 at which the washer liquid W1 is injected relative to the wiped surface 71c of the first widow panel 71 is small.

As shown in FIGS. 2 and 8, the stop position Ps of the wiper blade 83 is located on the first window panel 71 far away from the parting line L3. Unlike the wiper blade 83 in the stop position Ps, the region A1 onto which the washer liquid W1 is injected is located near the parting line L3. The washer liquid W1 should be injected from the first nozzle 91 toward the wiper blade 83. The wiper blade 83 can receive a splash of the washer liquid W1 upon the injection of the washer liquid W1 onto the region A1. This ensures the supply of the washer liquid W1 from the first nozzle 91 to the first window panel 71.

The wiper blade 83 starts to move from the stop position Ps for wiping operation after the first nozzle 91 injects the washer liquid W1 onto the region A1. As a result, the wiper blade 83 can efficiently and quickly apply the injected washer liquid W1 over a wide area of the wiped surfaces 71c, 72c of the first and second widow panels 71, 72. This makes it possible for vehicle passengers to quickly have a field of view through the first and second window panels 71, 72.

As is clear from the foregoing, the washer liquids W1, W2 can be reliably supplied from the washer liquid nozzle unit 90 to both of the two window panels 71, 72.

In the embodiment, as shown in FIGS. 2 and 6, the injection port 92a of the second nozzle 92 is directed to inject the washer liquid W2 to the transparent region 72b of the second window panel 72 along the edge portion 72d located alongside the parting line L3.

When the wiper blade 83 pivots from the wiped surface 71c of the first window panel 71 across the parting line L3 toward the wiped surface 72c of the second window panel 72, the wiper blade 83 at first reaches the edge portion 72d of the transparent region 72 of the second window panel 72. As a result, the injected washer liquid W2 along the edge portion 72d located alongside the parting line L3 can be quickly applied by the wiper blade 83 over a wide area of the wiped surface 72c. This makes it possible for vehicle passengers to quickly have a field of view through the second window panel 72.

In the embodiment, as shown in FIG. 8, the surface 73 defined by the entire wiped surfaces 71c, 72c of the first and second window panels 71, 72 is outwardly convex throughout in the direction of the side-by-side arrangement of the window panels 71, 72. The curve centerline C2 (the apex Pt) of the curved surface 73 is located on the same side of the parting line L3 as the first window panel 71. An amount of outward protrusion of the curved surface 73 becomes greater from the parting line L3 toward the curve centerline C2 (the apex Pt) such that the amount of the outward protrusion is the greatest on the curve centerline C2. The amount of the outward protrusion becomes smaller from the curve centerline C2 in a direction opposite from the parting line L3.

The region A1, onto which the washer liquid W1 injected from the first nozzle 91 lands, is closer to the parting line L3 than the curve centerline C2 is. That is, the region A1 of the wiped surface 71c of the first window panel 71 curved in the outward convex shape is positioned lower than the apex Pt. Thus, an injection angle θ1 at which the washer liquid W1 is injected relative to the wiped surface 71c of the first window panel 71 is large. The washer liquid W1 can be more reliably supplied from the first nozzle 91 to the predetermined region A1 of the first window panel 71.

In the embodiment, as shown in FIG. 8, the first and second nozzles 91, 92 are connected to the single tube 93 for feeding the washer liquids W1, W2 thereto. The use of the single tube achieves a simple structure for feeding the washer liquids W1, W2 to the first and second nozzles 91, 92.

The diameter d1 of the injection port 91a of the first nozzle 91 is smaller than the diameter d2 of the injection port 92a of the second nozzle 92. That is, the washer liquids W1, W2 are fed from the single tube 93 to the first and second nozzles 91, 92 of the different diameters d1, d2. The washer liquid is injected from the first nozzle 91 under a higher pressure due to the smaller diameter d1 of the injection port 91a of the first nozzle 91. Thus, the washer liquid W1 can be farther injected from the first nozzle 91. This enables quicker supply of the washer liquid W1 to a vicinity of the wiper blade 83.

Figure 9:
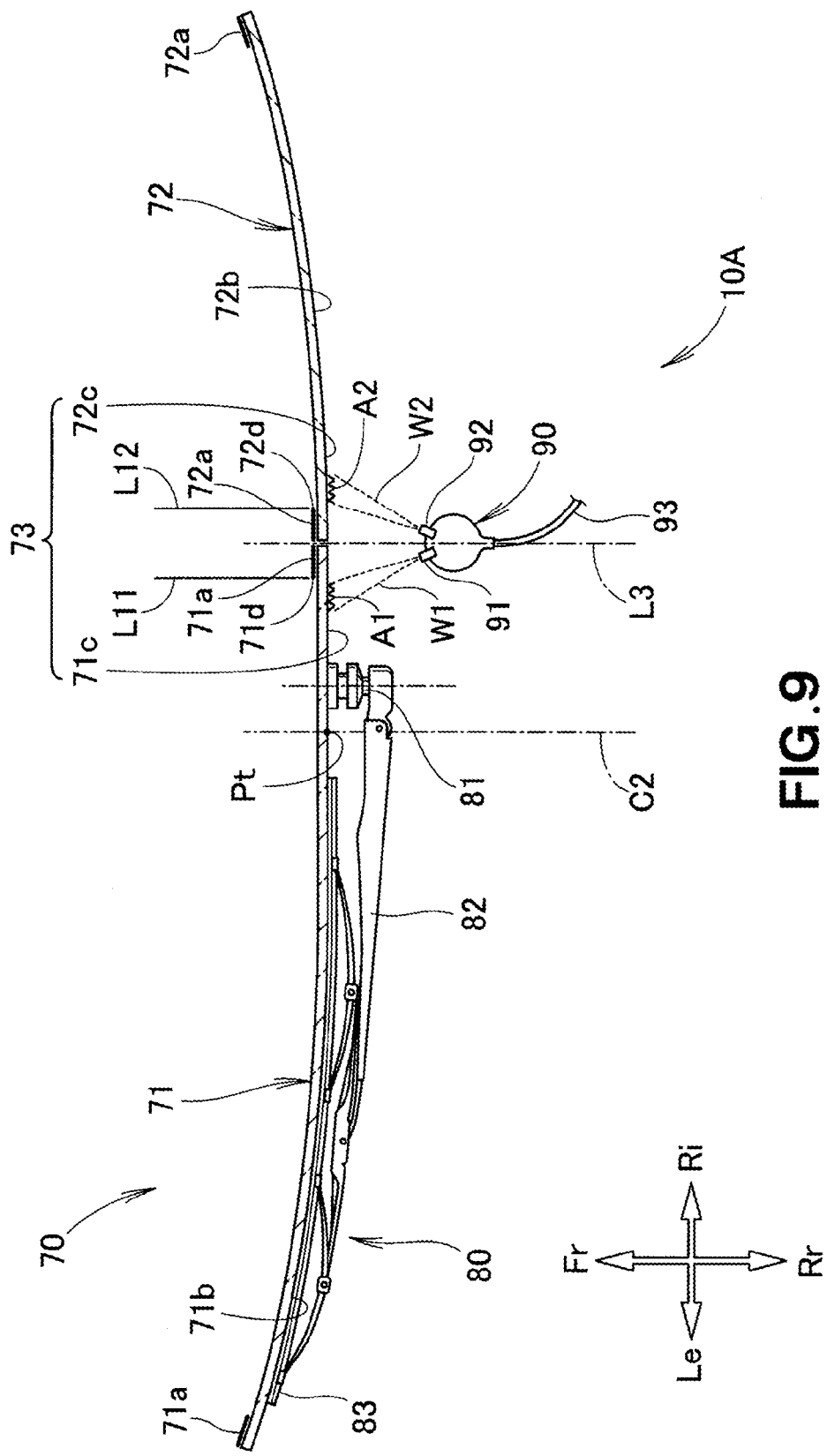
FIG. 9 is a cross-sectional view showing first and second window panels, wiper apparatus and washer liquid nozzle unit according to another embodiment of the present invention, as seen from above.

A vehicle 10A in another embodiment of the present invention is discussed below with reference to FIG. 9. The vehicle 10A has the same structure as that shown in FIGS. 1 to 8 except as illustrated in FIG. 9. FIG. 9 shows that the vehicle 10A has a washer liquid nozzle unit disposed in a different region from the washer liquid nozzle unit 90 shown in FIG. 8.

The washer liquid nozzle unit 90 of the vehicle 10A is located between a first straight line L11 along an edge portion 71d of the transparent region 71b of the first window panel 71 and a second straight line L12 along the edge portion 72d of the transparent region 72b of the second window panel 72. The edge portion 71d is located alongside the parting line L3, and the edge portion 72d is located alongside the parting line L3.

Since the washer liquid nozzle unit 90 is located between the first and second straight lines L11, L12, the washer liquids W1, W2 can provide their respective trajectories extending from the first and second nozzles 91, 92 to the regions A1, A2 without crossing the parting line L3.

The first and second nozzles 91, 92 inject the washer liquids W1, W2 toward the respective wiped surfaces 71c, 72c of the window panels 71, 72. The regions or points A1, A2, onto which the washer liquids W1, W2 injected from the first and second nozzles 91, 92 land, are located on the wiped surfaces 71c, 72c of the first and second window panels 71, 72, respectively, without spanning the parting line L3 between the window panels 71, 72.

The injection distances over which the washer liquids are injected from the first and second nozzles 91, 92 to the regions A1, A2 are short. Due to these short distances, the injection angles at which the washer liquids W1, W2 are injected relative to the wiped surfaces 71c, 72c of the first and second window panels 71, 72 are large. Thus, the washer liquids W1, W2 can be reliably supplied from the washer liquid nozzle unit 90 to both of the two widow panels 71, 72. Additionally, it can prevent a waste of the washer liquids W1, W2.

More preferably, the washer liquid nozzle unit 90 is located on the parting line L3 between the first and second straight lines L11, L12. This ensures that the washer liquid nozzle unit 90 injects the washer liquids W1, W2 to any points on the first and second window panels 71, 72 without the washer liquids W1, W2 crossing the parting line L3. Thus, the degree of freedom to set the injection angels in injecting the washer liquids W1, W2 onto the respective regions A1, A2 is great.

The present invention is applicable to a left-hand drive van and other kinds of vehicles such as buses although the right-hand drive van is discussed in the embodiments. That is, the present invention is not limited to the types or forms of the above embodiments as these embodiments are merely exemplary ones. It is to be understood that any changes or modifications to the embodiments are possible so long as the changes provide the same advantages as those of the embodiments.

The present invention is suitable for use as vans.

Obviously, various minor changes and modifications of the present invention are possible in the light of the above teaching. It is therefore to be understood that within the scope of the appended claims the invention may be practiced otherwise than as specifically described.

What is claimed is:

1. A vehicle comprising first and second window panels adjacent to each other and lying in a same curved surface, a wiper apparatus for wiping the first and second window panels, and a washer liquid nozzle unit for injecting washer liquids to the first and second window panels, the first window panel and the second window panel defining a parting line therebetween, the wiper apparatus comprising a pivot shaft located on a same side of the parting line as the first window panel, and a wiper blade pivotable on the pivot shaft to wipe the first and second window panel, the washer liquid nozzle unit being located on a same side of the parting line as the second window panel, and the washer liquid nozzle unit comprising a first nozzle for injecting a washer liquid to the first window panel, and a second nozzle for injecting a washer liquid to the second window panel, wherein the first and second window panels are arranged side by side, and the first and second window panels have outer surfaces to be wiped by the wiper blade, the outer surfaces defining the curved surface, the curved surface being entirely curved in an outward convex shape in a direction of the side-by-side arrangement of the first and second window panels, wherein the parting line is positioned between an apex of the curved surface and the washer liquid nozzle unit, and wherein the first nozzle has an injection port configured to inject the washer liquid to a region between the parting line and the apex of the curved surface on the first window panel so that the washer liquid infected from the infection port directly lands onto the region.

2. The vehicle of claim 1, wherein the second window panel includes a transparent region having an edge portion located alongside the parting line, and the second nozzle includes an injection port configured to inject the washer liquid to a region along the edge portion on the transparent region of the second window panel.

3. The vehicle of claim 2, wherein the first and second nozzles are connected to a single tube for feeding the washer liquids thereto, and the injection port of the first nozzle has a diameter and the injection port of the second nozzle has a diameter, the diameter of the injection port of the first nozzle being smaller than the diameter of the injection port of the second nozzle.

4. A vehicle comprising first and second window panels adjacent to each other and lying in a same surface, a wiper apparatus for wiping the first and second window panels, and a washer liquid nozzle unit for injecting washer liquids to the first and second window panels,
    the first window panel and the second window panel defining a parting line therebetween,
    the wiper apparatus comprising a pivot shaft located on a same side of the parting line as the first window panel, and a wiper blade pivotable on the pivot shaft to wipe the first and second window panel,
    the washer liquid nozzle unit being located on a same side of the parting line as the second window panel,
    the washer liquid nozzle unit comprising a first nozzle for injecting a washer liquid to the first window panel, and a second nozzle for injecting a washer liquid to the second window panel,
    wherein the first and second nozzles are connected to a single tube for feeding the washer liquids thereto, and the first nozzle has an injection port having a diameter and the second nozzle has an injection port having a diameter, the diameter of the injection port of the first nozzle being smaller than the diameter of the injection port of the second nozzle.

5. The vehicle of claim 1, wherein the first and second window panels, the wiper apparatus and the washer liquid nozzle unit are provided in a rear surface,
    the first and second window panels are arranged in a width direction of the vehicle, and
    the parting line offsets from a center line of the vehicle in the width direction.

6. The vehicle of claim 4, wherein the first and second window panels, the wiper apparatus and the washer liquid nozzle unit are provided in a rear surface,
    the first and second window panels are arranged in a width direction of the vehicle, and
    the parting line offsets from a center line of the vehicle in the width direction.

\* \* \* \* \*